UNITED STATES PATENT OFFICE.

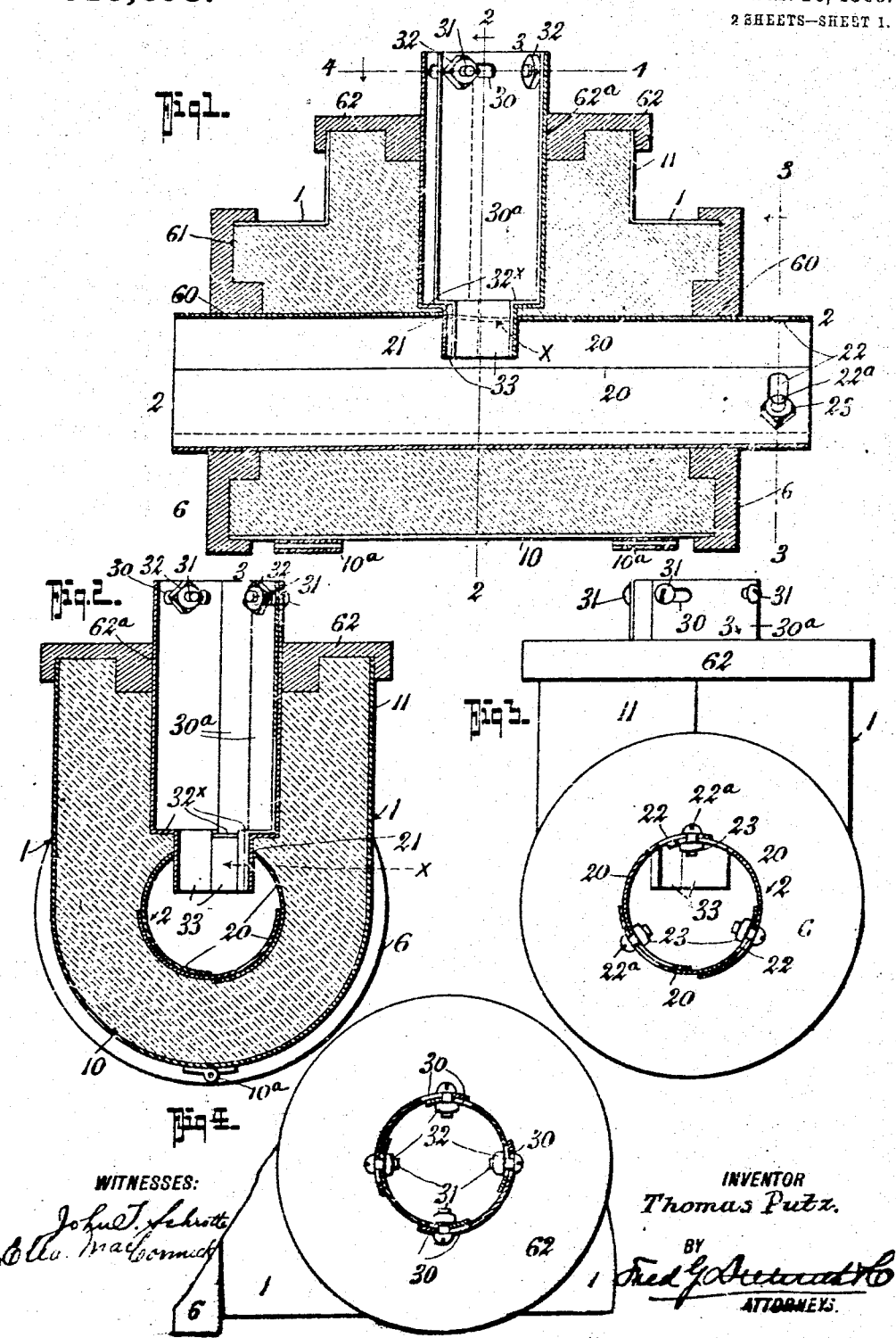

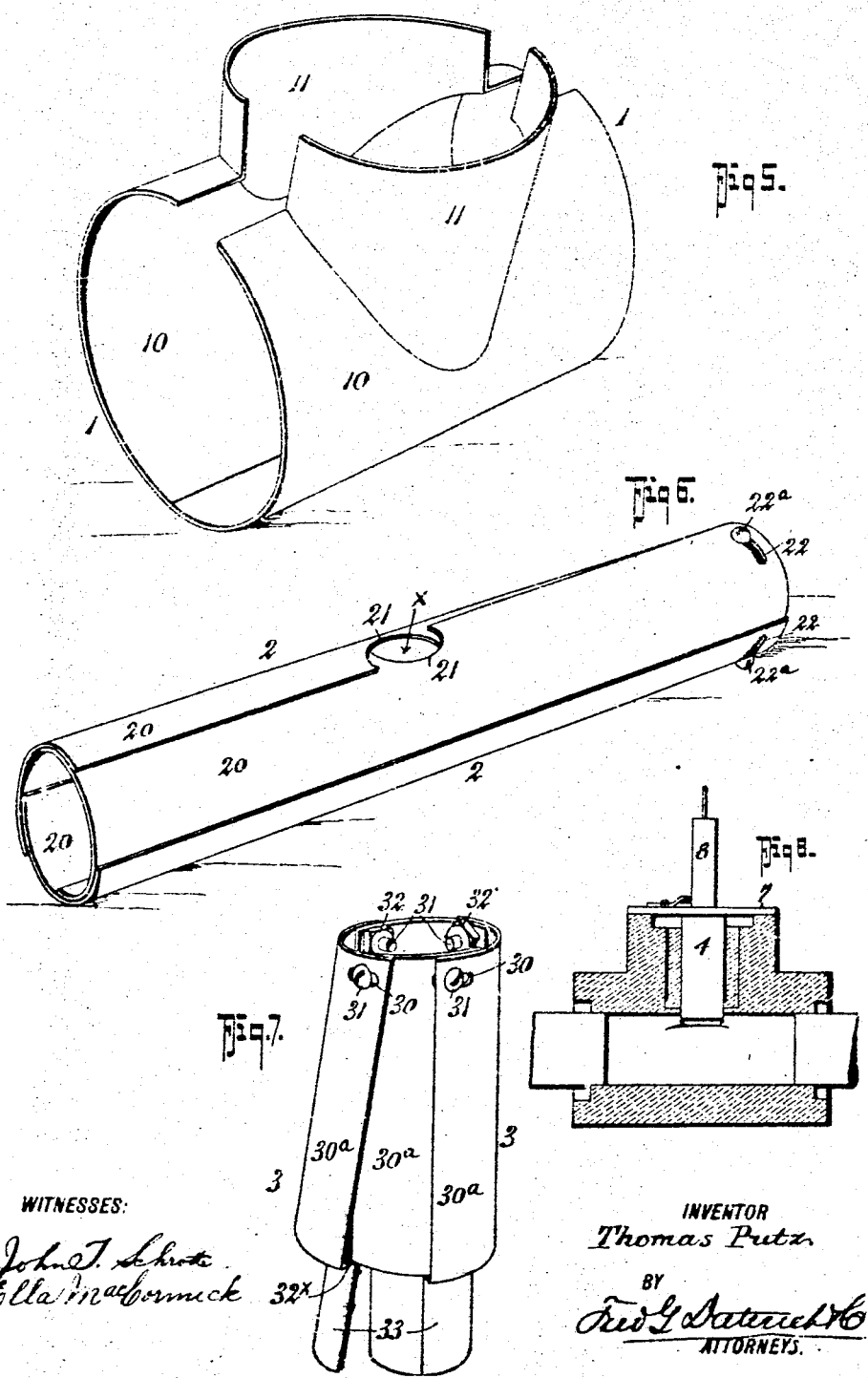

THOMAS PUTZ, OF PORTERVILLE, CALIFORNIA, ASSIGNOR TO PORTERVILLE CONCRETE COMPANY, OF PORTERVILLE, CALIFORNIA.

MEANS FOR MAKING CEMENT HEAD-GATES.

No. 915,698.          Specification of Letters Patent.          Patented March 16, 1909.

Application filed September 9, 1908. Serial No. 452,187.

*To all whom it may concern:*

Be it known that I, THOMAS PUTZ, residing at Porterville, in the county of Tulare and State of California, have invented a new and Improved Means for Making Cement Head-Gates, of which the following is a specification.

My invention relates to the construction of head gates for irrigating purposes, culverts, sewers or the like in which a temporary support for the cement is required, and has for its object to provide a convenient and coöperative arrangement of flexible and adjustable mold members that are more especially adapted for making head gates for irrigating purposes and capable of being easily applied for use and in which the several mold members are all so designed that they can be quickly collapsed to be readily removed after the cement has been set or dried.

My invention consists in the novel coöperative arrangement and detailed construction of parts that will be first described in detail, then be specifically pointed out in the appended claims, reference being had to the accompanying drawings, in which:

Figure 1, is a vertical, longitudinal section of my arrangement of molds and shows them combined for receiving the concrete filling. Fig. 2, is a cross section of the same on the line 2—2 of Fig. 1. Fig. 3, is a similar view of the same on the line 3—3 of Fig. 1. Fig. 4, is a horizontal section on the line 4—4 of Fig. 1. Fig. 5, is a perspective view of the main or T joint jacket, the same being shown partly open and the top and end caps thereof as removed therefrom. Fig. 6, is a perspective view of the main pipe forming the collapsible mold. Fig. 7, is a detail view of the supplemental or extension mold for the T joint jacket hereinafter specifically referred to. Fig. 8, is a diagrammatic section showing the complete cement head gate with the head gate filling and pipe sections in position.

In the practical application of my invention the same embodies three core or mold sections, the main mold section 1 which forms the T joint jacket, an extended collapsible tubular mold 2 around which the cement is set to form the pipe or main, and the extension mold 3 formed of adjustable sections and having a reduced pendent portion for extending and opening into the tubular pipe or forming mold 2.

The pipe forming mold consists of a plurality of segmental sections 20—20 preferably three, as shown, of sheet metal. These sections are held with their longitudinal edges overlapping and two of said sections have their overlapping sections provided with elongated semi-circular openings 21—21 to provide an opening $x$ to receive the reduced end of the pendent extension of the mold member 3, presently again referred to. At one end (or both ends, if desired) the mold sections 20—20 have transversely elongated slots 22—22, the slots in the several sections being in alinement to receive the clamps screws $22^a$—$22^a$ that carry clamp nuts 23—23, the purpose of the slots, the screws and the nuts being to provide for the desired transverse adjustments of the mold members 22—22, it being understood that after the cement is set or dried around the mold 2, the sections 20 can be readily collapsed and withdrawn from the cement forming pipe.

The mold 3 is formed of four segmental overlapping sections $30^a$ formed at the upper end with transversely extended elongated slots 30—30 through which pass set screws 31 that carry clamp nuts 32 as shown. The lower ends of the sections 30 terminate with inwardly extended horizontal flanges $32^\times$ and pendent supplemental segmental sections 33 that form the tubular extension for entering the opening $x$ in the mold 2, as clearly shown in Fig. 1, by reference to which it will be also observed that the pendent portion provides for an annular shoulder on the cement T that forms an opening $x$ of a smaller diameter than the collapsible core or mold 3 so that the pipe of smaller diameter than the vertical chamber of the head gate can be slipped down into the opening $x$ for coöperating with the head gate valve as will be presently more fully explained.

It should be stated that in the practical operation of my invention the molds are intended for working with wet mixed cement.

The main or T mold constitutes a jacket for holding the cement around the molds 2 and 3 and is formed of two semi-circular sections 10—10 hinged at the lower end as at $10^a$ and having vertical semi-circular extensions 11.

For fitting the parts together for use, the mold 2 is collapsed sufficiently to provide for sliding thereon two end caps 6—6, each having a central aperture 60 for that purpose. The jacket mold sections are closed and held to such position by slipping the caps 6—6 over the ends of the closed sections, the said caps having annular grooves 61 to receive the ends of the jacket mold, as clearly shown in Fig. 1. The several sections of the main or T-mold are extended to their maximum diameter desired and held to such adjustment by the screws at the ends thereof. After the jacket 1 and mold 2 have been set as described, another cap member 62 is placed on the top of the vertically extended portion of the jacket mold 1 after which the mold 3 is slipped into the opening 62$^a$ in the cap 62 and its pendent extension is pushed down into the opening $x$ in the said mold 2. The sections of the mold 3 are then adjusted and set. The cement filling is then poured into the jacket to surround the molds 2 and 3, the filling packing close under the bottom flange of the mold 3 so as to provide an opening $x$ to the horizontal pipe of a diameter smaller than the mold 3 so as to readily permit of putting in a smaller pipe 4, after the cement head gate has been completed. After the head gate has been formed by the setting of the cement, the mold 3 is collapsed and drawn up from the mold 2 which in turn is collapsed and is drawn out from the jacket 1, after which the several heads of the jacket are removed and the said jacket is spread and also removed. After the parts have been removed as stated, the pipe 4 is fit into the opening $x$ and its upper end is secured, in any well known manner, to the closure plate 7 which is now supported upon the top of the gate and which carries a valve 8 of any well-known type and as is generally illustrated in Fig. 8 of the drawings. To brace the pipe 4 a supplemental filling of cement, see Fig. 8, may be used.

From the foregoing, taken in connection with the accompanying drawing, it is believed that the complete construction and manner of operation of my invention will be readily understood by those skilled in the art to which it appertains.

Having thus described my invention, what I claim is:

1. A means for making cement head gates, comprising a contractible core having an opening, a supplemental contractible core having a pendent portion fitting in the opening, and a two part T shaped jacket adapted for surrounding the main and supplemental cores.

2. A means for making cement head gates, comprising a longitudinally disposed contractible core or mold, another contractible core mounted on the longitudinal core at right angles thereto and a two part T shaped jacket for incasing the two contractible cores.

3. A means for making cement head gates that comprises the following elements in combination; a T shaped jacket formed of separable members, apertured closure members for the end of the jacket, a contractible main core that extends lengthwise of the jacket with its ends projected through the end closures for the jacket and another contractible core that projects through the other closure member for the jacket and rests upon the main core.

4. In a means for the purposes stated, the combination of a main contractible core having a side opening, a supplemental contractible core having a pendent portion for extending down into the side opening in the other main mold, or core, and a two part T jacket adapted for incasing the two cores, as set forth.

5. In a means for the purposes described, the combination of a main contractible core or mold having a side opening, a supplemental contractible core or mold having a reduced portion at one end for fitting through the opening in the main mold or core, a T shaped jacket for incasing the two molds, said jacket having apertured cap pieces on its open ends for receiving the end, main and supplemental cores thereon, as set forth.

6. A cement head gate making means, that comprises a main contractible core having a side opening, a supplemental contractible core disposed at right angles to the other core and having pendent portions for extending into the side opening in the said other core and a jacket for surrounding the two cores.

7. A cement head gate making means that comprises a main contractible core having a side opening, a supplemental contractible core having a shoulder and a portion pendent from the shoulder for passing into the side opening, and a two part T shaped jacket that surrounds the two cores.

8. The combination of a main contractible core, having a side opening, a supplemental contractible core formed with a shoulder and a portion pendent from the shoulder to fit into the opening in the main contractible core, and a T shaped jacket for incasing the two cores, removable apertured end caps for each end of the jacket that form bearings for the main and supplemental cores.

THOMAS PUTZ.

Witnesses:
GEO. D. AVERY.
W. A. HALES.